(12) United States Patent
Boccaccini et al.

(10) Patent No.: US 10,464,257 B2
(45) Date of Patent: Nov. 5, 2019

(54) PRINTING METHOD AND DEVICE, COMPOSITE MATERIAL

(71) Applicant: PETROCERAMICS S.P.A., Stezzano (Bergamo) (IT)

(72) Inventors: Dino Norberto Boccaccini, Rubiera (IT); Massimiliano Valle, Bergamo (IT)

(73) Assignee: PETROCERAMICS S.P.A. (IT)

( * ) Notice: Subject to any disclaimer, the term of this patent is extended or adjusted under 35 U.S.C. 154(b) by 0 days.

(21) Appl. No.: 15/599,264

(22) Filed: May 18, 2017

(65) Prior Publication Data

US 2017/0334132 A1    Nov. 23, 2017

(30) Foreign Application Priority Data

May 20, 2016  (IT) .................. 102016000052235

(51) Int. Cl.
*B29C 64/141*  (2017.01)
*B33Y 10/00*  (2015.01)
(Continued)

(52) U.S. Cl.
CPC .......... *B29C 64/141* (2017.08); *B22D 23/003* (2013.01); *B22F 3/008* (2013.01); *B28B 1/001* (2013.01); *B29C 64/106* (2017.08); *B29C 70/14* (2013.01); *B29C 70/38* (2013.01); *B32B 5/12* (2013.01); *B32B 5/26* (2013.01); *B33Y 10/00* (2014.12); *B33Y 30/00* (2014.12); *B33Y 70/00* (2014.12); *B33Y 80/00* (2014.12); *C04B 35/62844* (2013.01); *C04B 35/62863* (2013.01); *C04B 35/62878* (2013.01); *C04B 35/657* (2013.01); *C04B 35/806* (2013.01); *C04B 35/83* (2013.01); *C08J 5/04* (2013.01);
(Continued)

(58) Field of Classification Search
CPC .................................................... B29C 64/141
USPC ........................................................ 428/113
See application file for complete search history.

(56) References Cited

U.S. PATENT DOCUMENTS 9,126,367 B1 *  9/2015  Mark ..................... B29C 70/20
9,149,988 B2   10/2015  Mark et al.
(Continued)

FOREIGN PATENT DOCUMENTS

| EP | 2894025 | 7/2015 |
|---|---|---|
| WO | 2014174540 | 10/2014 |
| WO | 2016/050357 | 4/2016 |

OTHER PUBLICATIONS

Italian Search Report, dated Feb. 14, 2017.

*Primary Examiner* — Brent T O'Hern
(74) *Attorney, Agent, or Firm* — Valauskas Corder LLC

(57) ABSTRACT

The present invention relates to a method of printing a composite material (1), for example polymeric, carbonaceous, siliconic or metallic comprising steps of:
i) providing a plurality of bundles (2) of reinforcement fibers (4), wherein the reinforcement fibers (4) have a length in the range 3-50 mm and are in the number of about 1,000-100,000 in each bundle (2);
ii) aligning the bundles (2) along a predetermined path (X, X');
iii) incorporating at least part of the bundles (2) into a matrix (6, 8), for example polymeric, carbonaceous, siliconic or metallic, preserving the alignment along said path (X, X');
iv) laying and solidifying at least one layer (8) of the matrix (6, 8) of step iii) to make the composite material (1).

16 Claims, 7 Drawing Sheets

(51) Int. Cl.
*B33Y 30/00* (2015.01)
*B33Y 70/00* (2015.01)
*B33Y 80/00* (2015.01)
*B22D 23/00* (2006.01)
*B22F 3/00* (2006.01)
*B28B 1/00* (2006.01)
*B32B 5/12* (2006.01)
*B32B 5/26* (2006.01)
*C04B 35/628* (2006.01)
*C04B 35/657* (2006.01)
*C04B 35/80* (2006.01)
*C04B 35/83* (2006.01)
*C08J 5/04* (2006.01)
*B29C 70/38* (2006.01)
*B29C 70/14* (2006.01)
*B29C 64/106* (2017.01)
*B29K 707/04* (2006.01)

(52) U.S. Cl.
CPC ..... *B29K 2707/04* (2013.01); *B32B 2260/023* (2013.01); *B32B 2260/046* (2013.01); *B32B 2262/106* (2013.01); *C04B 2235/3826* (2013.01); *C04B 2235/422* (2013.01); *C04B 2235/428* (2013.01); *C04B 2235/5248* (2013.01); *C04B 2235/616* (2013.01); *C08J 2300/00* (2013.01)

(56) References Cited

U.S. PATENT DOCUMENTS

2014/0061974 A1 3/2014 Tyler
2017/0015061 A1 1/2017 Lewicki

\* cited by examiner

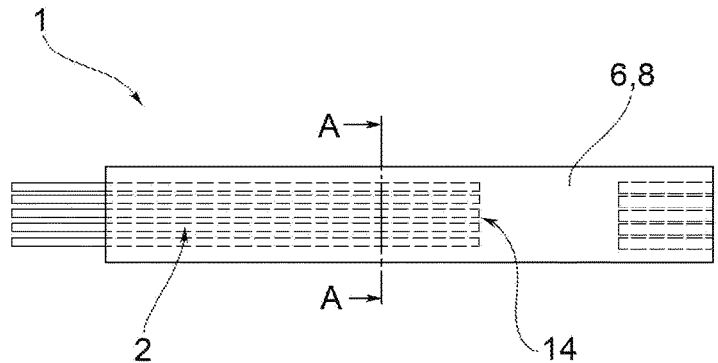
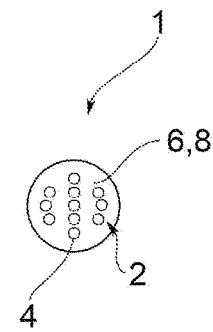
FIG.5  FIG.6
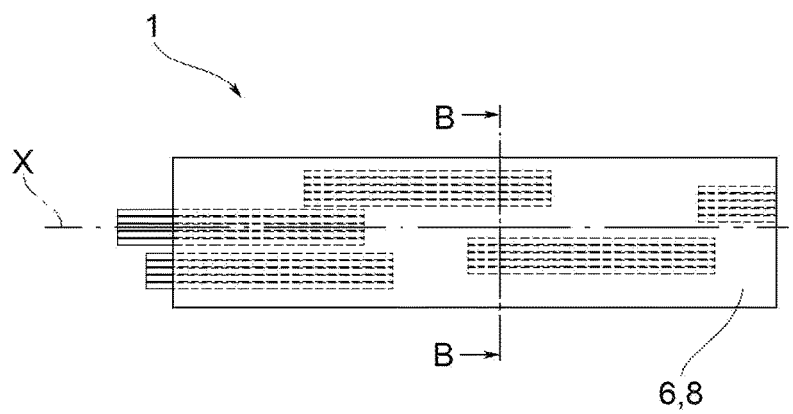
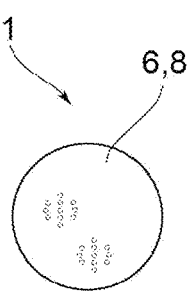
FIG.7  FIG.8
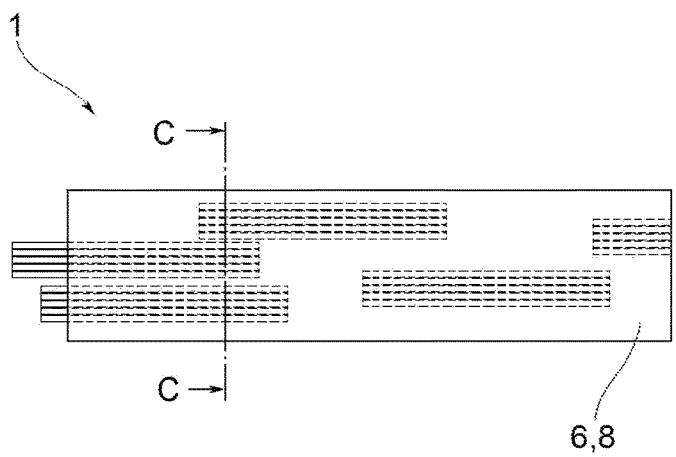
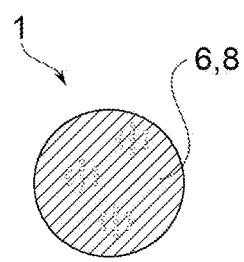
FIG.9  FIG.10

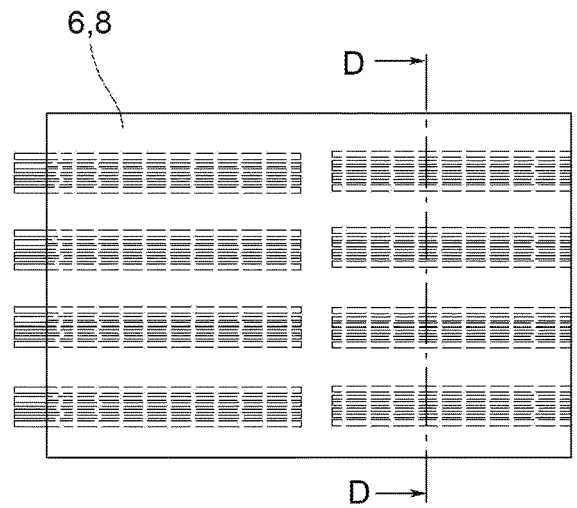
FIG.11
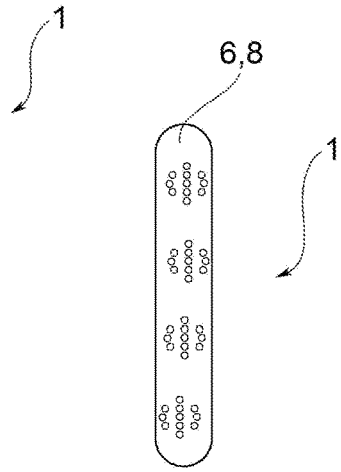
FIG.12
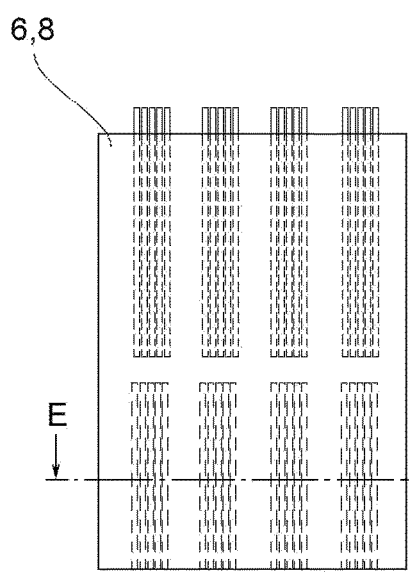
FIG.13
FIG.14
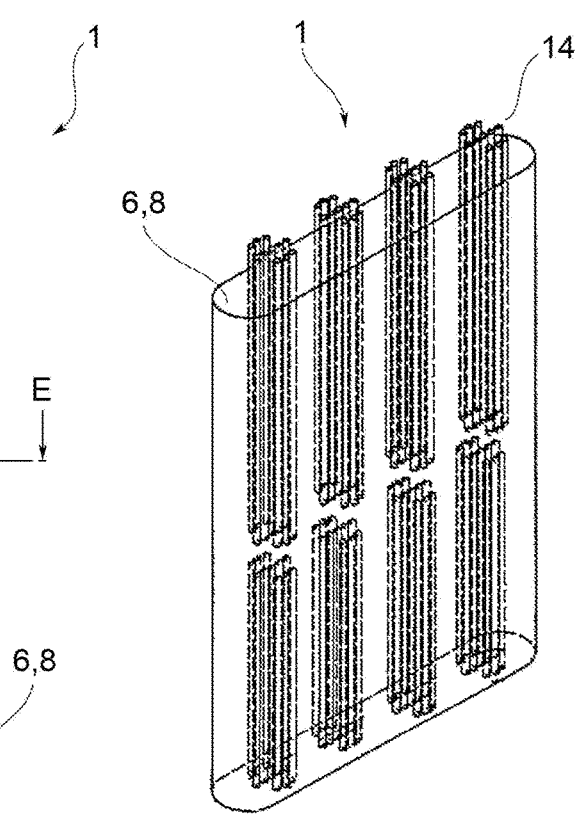
FIG.15

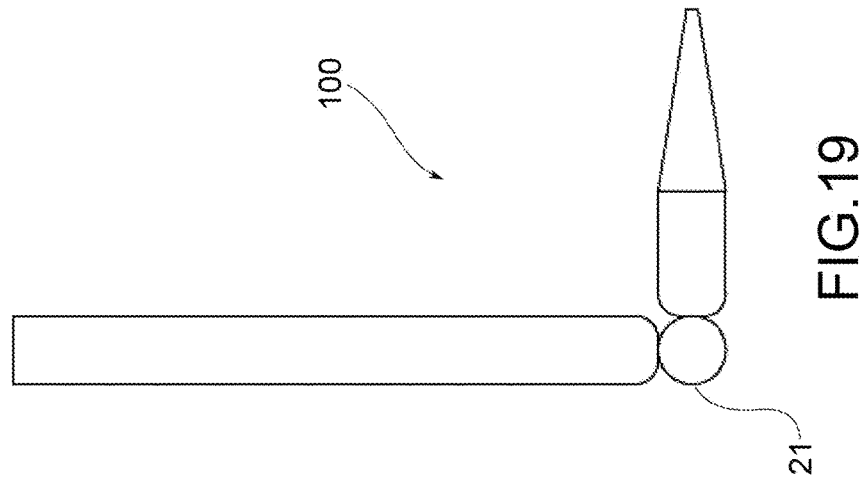
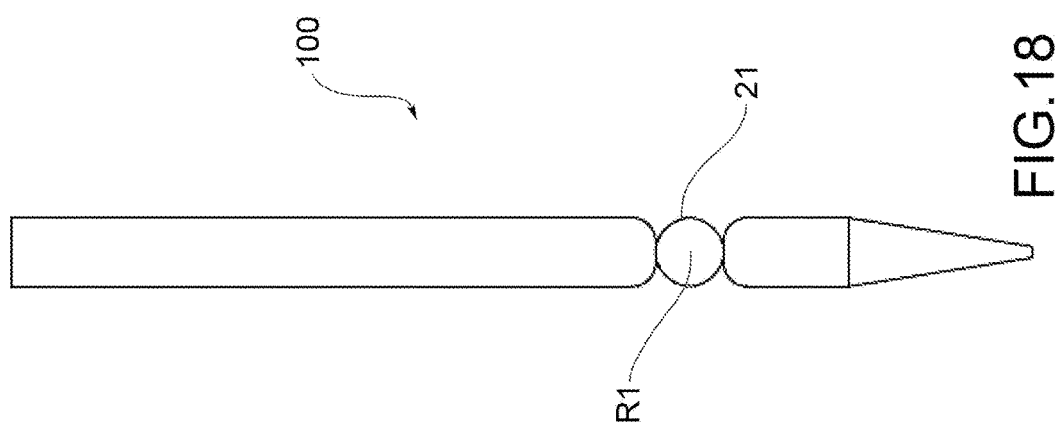
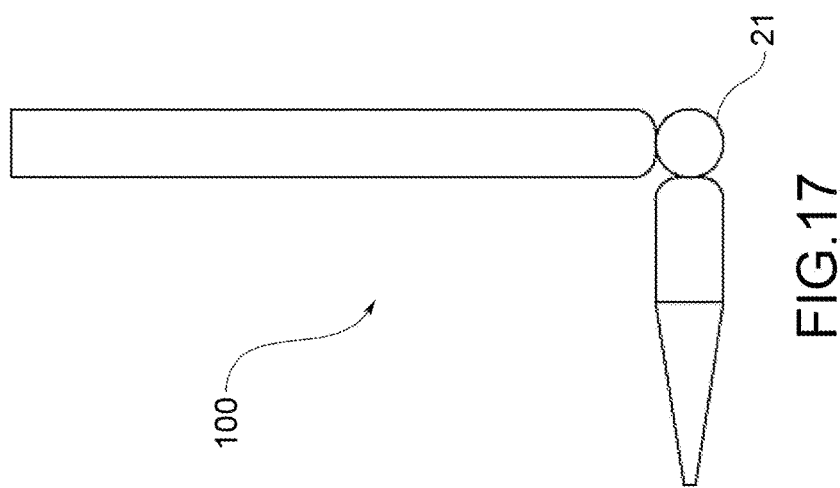

PRINTING METHOD AND DEVICE, COMPOSITE MATERIAL

CROSS REFERENCE TO RELATED APPLICATIONS

This application claims the benefit of Italian Applicant No. 102016000052235 filed May 20, 2016.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a method of printing a composite material, and a composite material preferably (but not necessarily) obtained by this method.

BACKGROUND OF THE INVENTION

Additive manufacturing techniques have become widespread in recent years which, with the overlapping of layers of a fluidised material, are capable of producing generally plastic products with high accuracy and with instruments whose implementation cost and investment is gradually reducing.

Recently, attempts have been made to make the products produced with this technique more efficient, in particular through the inclusion of specific substances (for example in the form of filament, fibre or powder) which, when incorporated in the final product, give the latter improved physical properties.

A fibre is a simple, elongated unit containing carbon, glass, or other elements adapted to be reduced to a simple unit. If the element is carbon, the fibre is called "carbon fibre".

A filament is the set of multiple fibres and/or polymers in a different form.

The techniques currently employed in the field of additive manufacturing do not allow satisfactorily coping with certain technological requirements.

DESCRIPTION OF RELATED ART

Patent application EP2894025 describes a method of implementing a structural assembly that can include a first and a second component. These first and second component are thermoplastic materials to which a reinforcement fibre is added. The technique used is layer deposition. These techniques describe continuous fibres and not fibre chops, resulting in less complexity in the process of inclusion in the article.

Fibre chop (or bundle) means a homogeneous grouping of fibres, consisting of 1,000 to 100,000 fibres side by side, substantially parallel and combined (for example mutually glued), preferably in one piece and in a length about in the range of 3-50 mm.

U.S. Pat. No. 9,149,988 describes different embodiments of 3D printers and reinforcement filaments, and their usage. The technique used is the traditional "additive manufacturing", with layers of different materials, also reinforced with fibres, which are extruded. Also in this case, the fibres are continuous and do not consist of fibre chops.

Patent application US2014/0061974 describes a method and an apparatus for additive manufacturing of 3D objects in which two or more materials are extruded simultaneously as a composite, with at least one material in liquid form and at least one material in solid form completely enclosed within the liquid material. This patent application describes a nozzle for the extrusion of different thermoplastic elements. This patent application does not provide for the possibility that the nozzle changes its orientation in space, while retaining the fibre output oriented according to the axis of the nozzle. Moreover continuous fibres not in chop form are used.

Finally, patent application WO2014/174540 by the Applicant describes a method for the manufacture of fibre-reinforced brake discs in which at least one layer of fibres of predetermined width is impregnated with at least one binding resin and wherein the resin-impregnated fibre layer is wound around a mandrel to form a coaxially hollow cylindrical body. The fibres are oriented in space during a winding step around a mandrel. However, the fibres cannot be oriented in different ways and/or orientations different from each other within the same layer. In order to change orientation of the fibres it is in fact necessary to lay one layer further, in addition to the first one laid, with different orientation. It is also not possible to change the length and nature of the fibres themselves within the same article.

There are also techniques with which it is possible to create complex geometry articles using continuous fibres, whose orientation is easily handled with various methodologies such as filament winding. These techniques today also provide for the use of fibres admixed with polymers. Another known technique provides for admixing the polymers with charges of short fibres or fibrous particles to disperse randomly in the matrix.

In currently known techniques, during the scrolling of the filament to create an article, the fibre bundles or chops break up, and/or disorientate, thus thwarting their addition.

BRIEF SUMMARY OF THE INVENTION

While the above prior art documents and known techniques address the issues related to inclusion of continuous or ground fibres, do not solve the issue felt, i.e. to provide a method of manufacturing an article, such as a brake disc, in which fibre bundles have different orientation and optionally length in space, thus ensuring numerous and/or varying degrees of freedom.

It has not been possible to develop, to date, an additive manufacturing technique implemented by admixing the polymeric materials with short fibre bundles (otherwise defined in this description "chops") and ensure the orientation in space thereof with desired degrees of freedom. The degrees of freedom of the fibres dispersed within a matrix are important to determine their behaviour in space, when subjected to stresses of thermal or mechanical nature. This matrix can be, for example, of a carbon, metal or silicone nature.

The present invention falls within this context by aiming to provide a method, an apparatus and a composite material able to overcome the drawbacks of the prior art.

The need to orient the fibres within an article or composite material according to the at least one preferred or predetermined direction is felt.

In addition, the need to be able to vary the fibre orientation within an article or composite material according to areas more or less subjected to mechanical/thermal stress is felt.

Advantageously, with the method of the present invention it is possible to orient the fibres or fibre bundles within the article or composite material.

Even more advantageously, it is possible to control the fibre orientation, length and volumetric concentration thereof.

In addition, it is possible to increase the mechanical and/or thermal strength of the product/article/composite material.

Moreover, it is possible to adapt the thermo-mechanical properties of the materials that control the distribution and concentration of fibres, thus increasing the mechanical properties in the most critical areas, and the thermal properties in preferential directions. More specifically, the authors of this invention were able to define a method for the additive manufacturing of polymer composite materials comprising preferably short fibre bundles or chops.

The present invention allows laying a packet or bundle of fibres oriented in space as desired (X; Y; Z) through the deposition through a nozzle 62 (which is a possible example of laying means 62 described hereinafter), configured so as to lay the fibres according to a predetermined direction/orientation, and an addition of a resin in the vicinity of the laying point.

Advantageously the fibre bundles or packets having desired length (typically from 3 to 50 mm) will consist of a number of from 1,000 to 100,000 fibres.

Advantageously, the fibre bundles or packets are aligned before reaching said nozzle 62. Even more advantageously, the fibre bundles or packets are aligned using mechanical vibrations on a conveyor, before reaching the nozzle. Alternatively, the fibre bundles or packets are aligned using electromagnetic fields, in a special unit, before reaching the nozzle.

Advantageously, the fibre bundles or packets can be cut, such as from a continuous or longer filament, in segments of the desired length during the laying step, prior to the addition of resin or preferably after the addition of resin. The segmentation of fibre bundles or packets in the laying step allows effectively using fibre bundles of different lengths within the same article, positioning the fibres in different ways where they are needed (for example in larger amounts where the major mechanical and/or thermal stresses of the article will concentrate) and with the orientation required (X; Y; Z).

Advantageously, multiple nozzles can be used simultaneously or sequentially—allowing the simultaneous use of bundles of different dimensions (for example in terms of length and/or section), present in variable amounts or concentrations. This widens the degree of freedom in the design of short fibre composite materials (or rather, short "bundle"), structuring the article based on the desired requirements.

The technique of the present invention can be integrated with other techniques used for continuous fibres or charged resins, to create a range of products or articles in which the technical and economic value of the components used can be optimised. For example, long fibres may be provided in the outer part of the article, and short fibres oriented conveniently inside the material, or vice versa.

The technique of the present invention can advantageously allow the manufacture of a product/article with preferably polymer matrix, with useful features for its end use.

Alternately with such a technique it is possible to implement a preform processable according to various known techniques for producing dense, preferably polymer composites. The resulting preform can be subjected to further consolidation processes such as Resin Transfer Moulding techniques or RTM or PIP, Polymer Impregnation and Pyrolysis, or pressing or other commonly known techniques of densification, forming of polymeric and/or metal materials.

This method can be used for the manufacture of polymer matrix composite materials using the traditional polymers usually used to impart the desired features to the article. Epoxy resins, PEEK or other known polymers can for example be used for the production of composites and to impart the desired features to the article. The fibre used to make the fibre packets or bundles may be carbon fibre, glass fibre, basalt fibre, polymer fibres such as kevlar, other known fibres for making composites, or combinations thereof.

Alternately, a ceramic matrix material manufacturing technique involves the construction of a preform, then pyrolised and then infiltrated with liquid metals, or preferably using silicon, for example to obtain Carbon Ceramic Material (CCM) articles. Advantageously, such CCM articles brake discs for automotive/aerospace applications.

This method can be effectively used in the manufacture of carbon fibre/carbon (Cf/C) composite preforms in which the carbon matrix that binds the carbon fibres derives at least partly from the pyrolytic decomposition of a polymer (typically phenolic or epoxy resins are used as carbon sources).

This method can be effectively used for the manufacture of ceramic matrix/carbon fibre composite preforms (Cf/Si/SiC) in which the matrix can typically consist of silicon and silicon carbide.

BRIEF DESCRIPTION OF THE SEVERAL VIEWS OF THE DRAWING(S)

The present invention will now be described with the aid of the accompanying drawings, in which:

FIGS. 1, 2, 3, 4 show longitudinal sections of nozzles that can be used in the present laying process, according to various embodiments;

FIGS. 5 and 6, 7 and 8, 9 and 10, 11 and 12 show in pairs, respectively, a top view of examples of filament according to the present invention and a cross section through the same filaments, along planes A-A, B-B, C-C, D-D, respectively, where the fibre bundles in different concentration with respect to the matrix are visible;

FIGS. 13, 14, 15 show a top view of a further example of filament according to the present invention, a cross section through the same filament along plane E-E in FIG. 13, and a corresponding perspective view, respectively;

FIGS. 17, 18, 19 show a schematic of possible orientations of a laying head 100 according to the present invention, rotated—according to the arrangement shown—leftwards, downwards and rightwards, respectively, by virtue of the connection joint denoted by reference numeral 21.

DETAILED DESCRIPTION OF THE INVENTION

Figure 1:
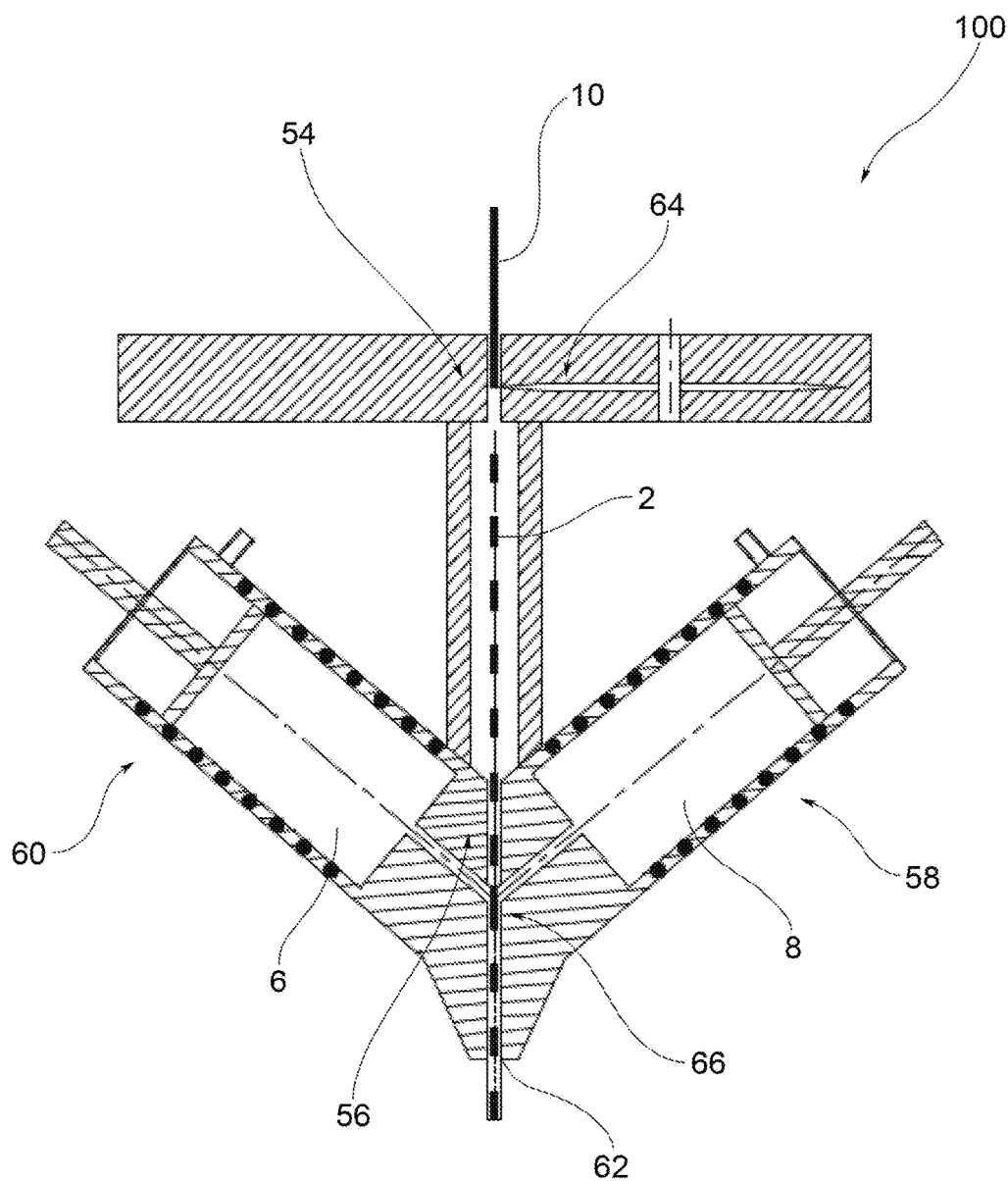

The above object is achieved by a printing method of an article or composite material 1 comprising the steps of:
i) providing a plurality of bundles 2 of reinforcement fibres 4, having a length approximately in the range 3-50 mm, where the reinforcement fibres 4 are in the range of about 1,000-100,000 for each bundle 2;
ii) aligning bundles 2 along a predetermined path X, X', such as straight and/or curved;
iii) incorporating at least part of bundles 2 in a matrix 6 (for example polymeric, carbon, silicone or metal), preserving the alignment thereof along such a path, for example by laying nozzle 62;
iv) laying and solidifying at least one layer of matrix 6 and 8 of step iii) to make the composite material 1.

Preferably, bundles 2 of step iii) are fully incorporated into matrix 6 and 8, such as shown in FIGS. 6, 8, 10, 12, 14.

Advantageously, step ii) takes place before step iii), whereby the bundle alignment is "dry", before the matrix wets the bundles and the respective fibres. In this regard, see for example the embodiment in FIG. 1 or FIG. 4.

In the feeding line of the bundles, before reaching the laying means 62 (and specifically the nozzle), an equipment 50 is provided in which the bundle of fibres are oriented in mutual alignment. The role of such equipment 50 therefore is to create a continuous series of aligned bundles. Purely by way of example, a vibrating channel of such equipment 50, specifically having a shrinking width shape may be part of the alignment means 56 of bundles 2, being particularly usable to create a string of fibre bundles.

A bundle or packet of fibres having a certain length coming from the alignment means 56 reaches the laying means 62. Separately, within the feeding means 58, 60, the polymer matrix is heated and maintained at a specific melting temperature, in which it is in liquid or semi-liquid form, before feeding the laying means, preferably by extrusion from a piston 70. The viscosity of the resin must be defined so as to be compatible from the rheological standpoint and suitable for the selected extrusion system.

Figure 4:
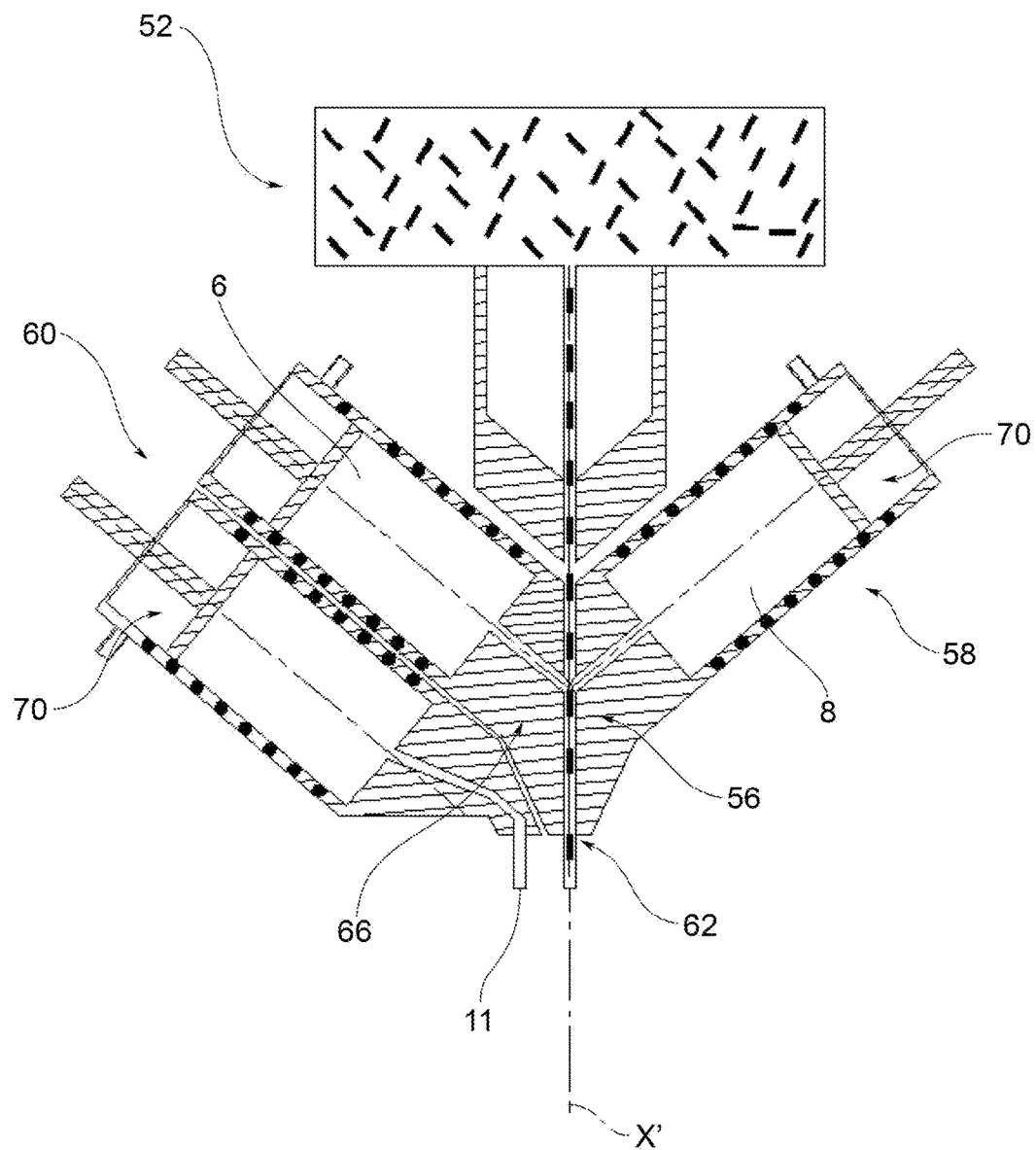
Figure 16:
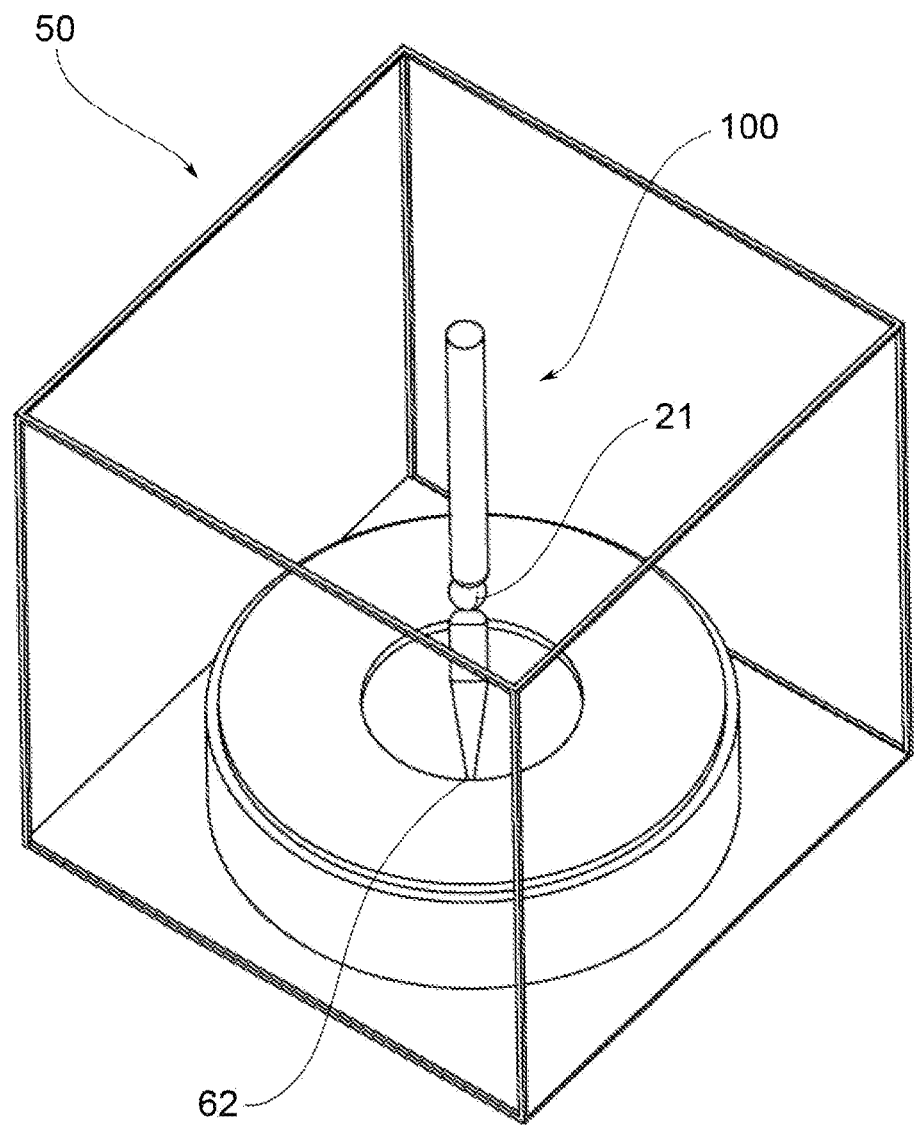
FIG. 16 shows a schematic of an equipment designed to implement the method object of the present invention, according to a variant.

Alternatively, equipment 50 may comprise feeding means 58, 60, 61 of different types, to feed more than one matrix to the article or composite material (FIG. 4). A piston heating unit may be charged with the heated matrix, and extruded to feed—such as directly—the laying means, specifically to a printing head thereof, optionally with a resin other than the one that at least partly incorporates the fibre chops.

In a variant of the present invention, the matrix filament extruded from the second nozzle may be pre-charged with powders or single ground fibres, for example of carbon. The ground fibre and the matrix, for example in the form of powder, could be loaded into a mixer, the mixture may then be heated in a heating unit and then extruded, feeding directly the laying means. The percentage by weight of ground carbon fibre reinforcement should preferably be kept in the range of 1% to 20% by weight.

According to a further variant, matrix 6, 8 of step iii) is a flowing phase, such as liquid or (semi-) liquid. The melting, and thus heating, temperature of the matrix is between 60 and 200° C.

According to a second variant, the matrix 6, 8 is a cross-linkable/solidifiable matrix.

According to an advantageous embodiment, bundles 2 comprise between 1,000 and 100,000 reinforcement fibres 4 side by side (preferably in a substantially parallel manner) and joined (for example mutually glued or welded), preferably in one piece.

According to a further embodiment, the reinforcement fibres 4 (and therefore also the corresponding bundles) have a length about in the range 3-50 mm or in the range 6-30 mm.

According to different variants, step i) may comprise an alignment of bundles 2 through a mechanical force, e.g. through vibrations or manual, applied to the bundles, and/or may comprise an alignment of bundles 2 through an electric field, a magnetic field or an electromagnetic field, applied to bundles 2 themselves.

As regards step i), this step may comprise sub-steps of: a) feeding filaments of continuous fibres 10; b) separating, for example through cutting operations, the plurality of bundles 2 from a filament of continuous fibres 10.

Figure 2:
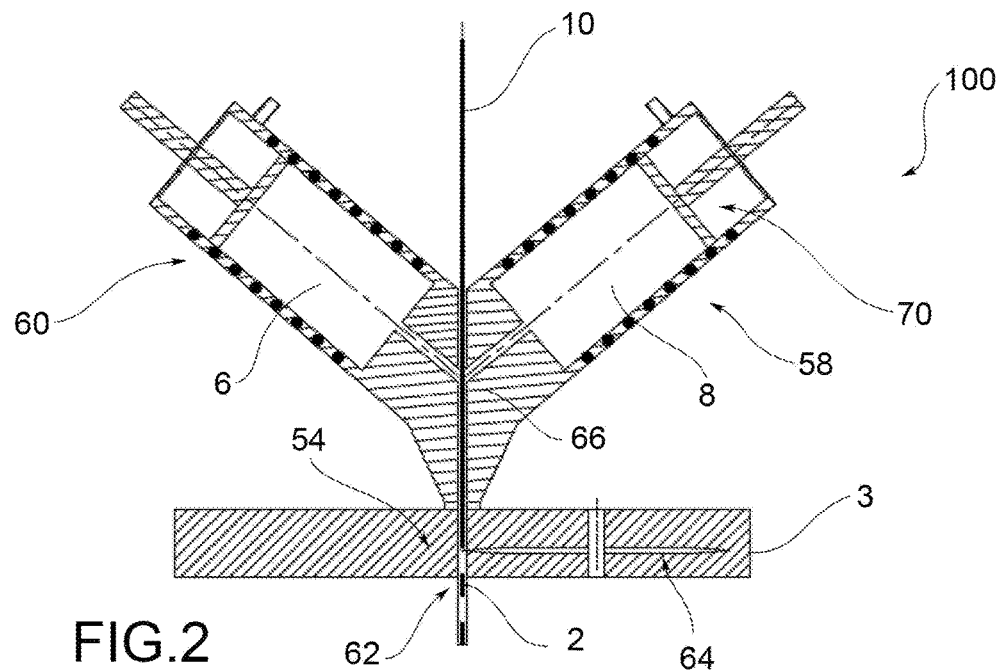
Figure 3:
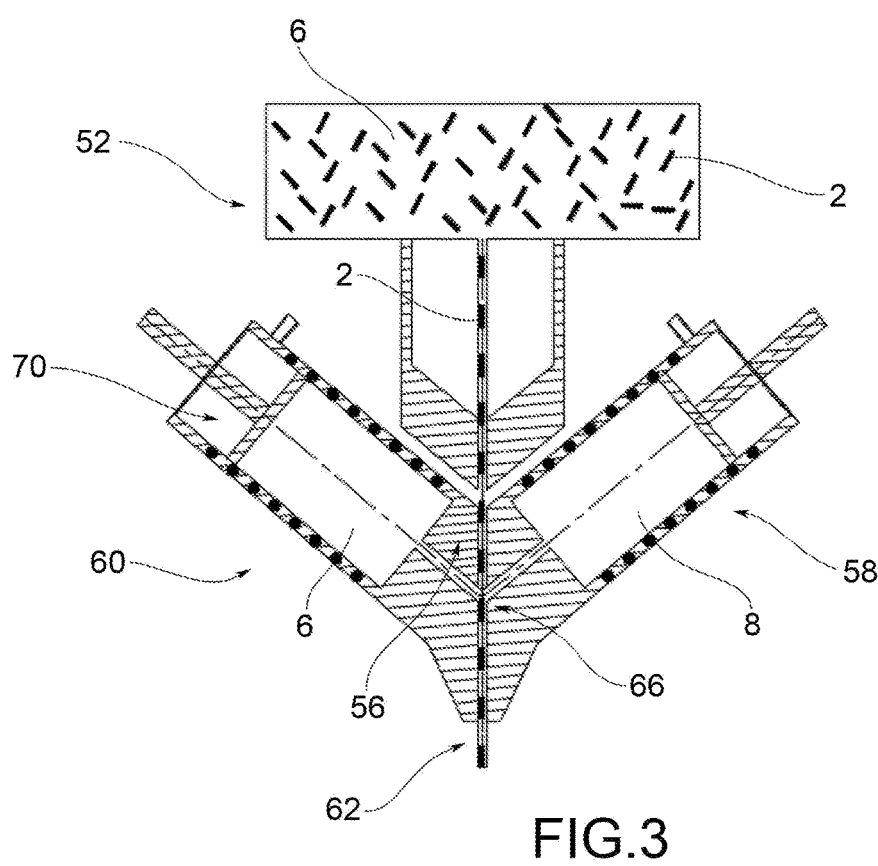

The cutting step in order to produce bundles or chops 2 may take place starting from filaments of continuous fibres prior to the step of alignment and addition of the matrices (FIG. 1) or in the vicinity of the extrusion nozzle after the addition of the matrices to the fibre filaments (FIG. 2). Separating of sub-step b), bundles 2 are still joined in longitudinal direction and constitute reinforcement filaments 10 mutually joined. Only at sub-step b), for example comprising a cutting operation, filaments 10 are transformed into bundles or chops since these filaments are cut into shorter fragments which form the above bundles or packets 2.

As regards the technical means to apply the above method, reference shall be made to the following description. According to an advantageous variant, such as shown in FIG. 5 or 6, or in FIG. 8 or 10, step iv) comprises a sub-step of laying at least one layer of matrix 6, 8 with a thread-like conformation.

For example, the section of the product laid in step iv) may be substantially circular or polygonal.

According to a further advantageous variant, such as outlined in FIG. 12 or 15, step iv) comprises a sub-step of laying at least one layer of matrix 6, 8 in the form of tape or mat containing a plurality of bundles 14 that develop longitudinally, and for example substantially parallel to each other, within such a tape or mat.

The shape of the array layer will therefore depend on the technological contingencies and on the destination or use of the material.

The variants shown in FIGS. 5 to 15 show the shape of the filaments or tapes that can be created from the equipment necessary to carry out the blending of bundles-matrix. The shape and size of the filament/tape produced (continuous two-dimensional element) can range from size a little larger than that of the selected bundle with the addition of the matrix required by the selected process and application (minimum diameter of about 0.2 mm) to large enough as to incorporate multiple bundles side by side (for example 100-200 bundles; 10 cm2 section), and shapes that can in this case be different (cylindrical, parallelepiped laminar) and functional to the additive process to be carried out and shape of the article or composite material being manufactured.

In any case, the different shape of the matrix could be obtained through an appropriate selection of a laying/extrusion chain or nozzle usable in step iv).

For example, step iv) may comprise at least one step of mutually superposing a plurality of layers of the step iii) product to obtain a three-dimensional composite material 1 in which said layers preferably differ from each other in the concentration of bundles 2 in matrix 6, 8, in the number and/or length of the reinforcement fibres 4 inside the chop and/or in the orientation of the predetermined paths X, X', and thus in relation to the orientation of bundles 4 in the composite material 1.

According to this embodiment, the printing method therefore is a real three-dimensional printing method, or additive manufacturing method, of the composite material enriched with the bundles that improve the mechanical and/or thermal strength features thereof, resulting in unusual and unexpected geometries and technical features in the light of the current technical landscape.

In other words, the mechanical features of the article or composite material can be designed in order to make it perform better at the zones or directions along which the greater stress is expected.

According to a technologically important variant, step iii) and step iv) are separated by a sufficiently short time to prevent the fragmentation of bundles 2 into reinforcement fibres loose from the respective bundle 2, for example randomly dispersed in matrix 6, 8.

In other words, since some matrices in flowing form could exert deleterious effects on the integrity of the bundles (e.g. mainly due to phenomena linked to the scrolling of the matrix itself or by virtue of their solvency disruptive power), it is preferable that the time between step iii) and step iv) is commensurate with the nature of the matrix. It is also recommended that the degrees of relative motion between the bundles of fibres and matrix are reduced. Optionally, the present method may also comprise a step of localized compression of the product from step iii), upstream of the solidification sub-step, for example in order to impart a semi-temporary track to this product will be consolidated during the solidification step.

The above object is also achieved by a printing equipment 50 of a composite material 1, for example to implement a method according to any of the preceding claims.

Such equipment 50 comprises:
supply means 52, 54 of a plurality of bundles 2
  alignment means 56 of bundles 2 along a predetermined path X, X';
  means of feeding 58, 60 at least a liquid, semi-liquid or powder matrix 6, 8, for example polymeric, carbonaceous, silicone or metallic, ending along the predetermined path X, X' to incorporate at least part of bundles 2 in such a matrix 6, 8, and configured to preserve the alignment of bundles 4 along such a path X, X';
  means of laying 62 at least one layer of matrix 6, 8 incorporating at least part of bundles 2 to make the composite material 1.

According to a preferred variant, the supply means 52, 54, the alignment means 56, the feeding means 58, 60 and the deposition means 62 are integrated in a laying head 100 of such equipment.

Preferably, the supply means 54 comprise cutting means 64—such as a rotating knife or a sharp element that is movable with respect to the filaments of continuous fibres 10—for separating the reinforcement filaments 10—grouped together—in a plurality of bundles 2, such supply means being arranged upstream (FIG. 1) or downstream (FIG. 2) of the ending zone 66 of the feeding means 58, 60 along the predetermined path.

Alternatively, the supply means 52 may comprise a container containing bundles 4 dispersed in a suitable means for their transport.

According to a further variant, the laying means 62 or said laying head 100 may be fitted in an articulated manner to the supply means 52, 54, around at least one axis of rotation R1, in particular through at least one connection joint 21 interposed between said means 52, 54, 62. Preferably, the laying head 100 could be articulated around a plurality of mutually incident axes of rotation, such as mutually orthogonal.

Finally, the above object is achieved by a composite material 1 as described hereinafter.

Preferably, such a composite material is achieved through the method according to any one of the preceding embodiments. It follows that, even where this is not expressly stated, this material may comprise any preferred or accessory feature deductible—from a structural or process point of view—from the description above.

Such a material 1 comprises a plurality of bundles of reinforcement fibres 4, wherein the reinforcement fibres 4 have a length in the range 3-50 mm and are in the number equal to or larger than about 1,000-100,000 in each bundle. Such bundles 2 are aligned along a predetermined path X, X' and are at least partially embedded in a matrix 6, 8, such a matrix 6, 8 being laid and solidified in at least one layer to achieve such a material 1.

According to a further variant, such a material includes a plurality of superimposed matrix layers, laid and solidified to obtain a three-dimensional composite material 1 having desired thickness and/or morphology.

Innovatively, the invention described is able to overcome the above drawbacks of the prior art.

More precisely, the method, equipment and material object of the present invention combine desirable mechanical properties of the finished product with the ability to produce through additive technique.

In addition, the method and the equipment described advantageously allow obtaining product geometries that, with the same strength, were believed impossible according to the prior art.

Advantageously, the method and the equipment object of the present invention allow superior mechanical features compared to the articles that can be obtained traditionally in three-dimensional printing.

Advantageously, the method, the equipment and the material object of the present invention allow obtaining products with orders of magnitude higher than other thermo-melting plastics, and nevertheless suitable for a 3D printing process.

Advantageously, the method, equipment and material object of the present invention allow manufacturing materials in any shape, including the most complex shapes, with virtually absent waste of raw materials.

Advantageously, the method, equipment and material object of the present invention allow positioning the layers of matrix with very high accuracy and precision.

Advantageously, the object of the present invention allows obtaining articles, for example polymeric, with a high resistance.

A man skilled in the art may make several changes or replacements of elements with other functionally equivalent ones to the embodiments of the above method, equipment and composite material in order to meet specific needs.

Also such variants are included within the scope of protection as defined by the following claims.

Moreover, each variant described as belonging to a possible embodiment may be implemented independently of the other variants described.

SEQUENCE LISTING

Not applicable.

The invention claimed is:

1. A method of printing a composite material, the method comprising steps of:
    i) providing a plurality of bundles of reinforcement fibres, wherein the reinforcement fibres have a length in a range 3-50 mm and are in a number of about 1,000-100,000 in each bundle;
    ii) aligning the bundles along a predetermined path;
    iii) incorporating at least part of the bundles into a matrix and preserving an alignment along said path;
    iv) laying and solidifying at least one layer of the matrix of step iii) to make the composite material, wherein the step ii) of aligning comprises an alignment of the bundles by means of a mechanical force and/or by means of an electric field, a magnetic field or an electromagnetic field, applied to the bundles, wherein the step ii) of aligning takes place before the step iii) of incorporating, whereby the alignment of the bundles is before the matrix wets the bundles and the reinforcement fibres of the bundles.

2. The method according to claim 1, wherein the bundles comprise said number of reinforcement fibres side by side and joined into a single body.

3. The method according to claim 1, wherein the step ii) of aligning comprises an alignment of the bundles by means of a mechanical force by means of vibrations.

4. The method according to claim 1, wherein the step i) comprises sub-steps of: a) feeding filaments of continuous reinforcement fibres; b) separating the plurality of bundles of said filaments.

5. The method according to claim 1, wherein the step iv) comprises a sub-step of laying at least one layer of the matrix with a thread-like conformation.

6. The method according to claim 1, wherein the step iv) comprises a sub-step of laying at least one layer of the matrix in a form of a tape or mat containing a plurality of bundles rows which extend longitudinally and substantially parallel to each other inside said tape or mat.

7. The method according to claim 1, wherein the step iv) comprises at least one step of superposing a plurality of layers of the step iii) to obtain a three-dimensional composite material in which such layers differ from each other in a concentration of bundles in the matrix, in a number and/or length of the reinforcement fibres inside at least one pair of layers and/or in an orientation of predetermined paths, and thus of the bundles in the composite material.

8. The method according to claim 1, in which the step iii) and the step iv) are separated by a time to prevent a fragmentation of the bundles into reinforcement fibres loose from a respective bundle, wherein the respective bundle is randomly dispersed in the matrix.

9. The method according to claim 1, comprising a localised compression step of the step iii) upstream of a solidifying sub-step.

10. The method according to claim 1, wherein the matrix of the step iii) is liquid, (semi-)liquid or a powder.

11. The method according to claim 1, wherein the bundles are at least partially made from carbon fibre, glass fibre, basalt fibre, polymer fibres such as kevlar, other known fibres for making composites, or combinations thereof.

12. The method according to claim 1, wherein the matrix is polymer, carbonaceous, siliconic or metal.

13. The method according to claim 1, further comprising a step of:
    depositing and solidifying superposed layers of the matrix to obtain a three-dimensional composite material, wherein said superposed layers differ in a concentration of bundles in the matrix, in a number and/or in length of reinforcement fibres inside at least a pair of layers and/or in an orientation of predetermined paths and thus in an orientation of the bundles.

14. The method according to claim 1, wherein the printed composite material is a brake disc.

15. The method according to claim 1, wherein the composite is polymeric, carbonaceous, silicone or metallic.

16. The method according to claim 4, wherein said separating step further comprises a step of cutting the plurality of bundles of said filaments.

* * * * *